Patented July 25, 1939

2,167,139

UNITED STATES PATENT OFFICE 2,167,139

TREATMENT OF GAS DISTRIBUTION SYSTEMS

John R. Skeen, Philadelphia, Pa., assignor to The United Gas Improvement Company, a corporation of Pennsylvania No Drawing. Application March 1, 1937, Serial No. 128,556

8 Claims. (Cl. 48—190)

Gas distribution systems include joints of various kinds which are packed with hemp, jute or other cellulosic fibrous absorbent material which in turn is backed up with lead or cement. The transmission of dry gas through the mains causes such joints to leak for the reason that the gas absorbs moisture from the fibrous packing.

Ethylene glycol or diethylene glycol, if successfully applied to the packing, oppose and in fact correct such gas leakage as described and claimed in copending application Serial Number 673,618, filed May 31, 1933, by Duncan B. Williams and which has matured into Patent 2,094,691, Oct. 5, 1937. For instance, diethylene glycol has been flowed along the bottom of the main into contact with the bottoms of successive joints and has been found to impregnate the packing by climbing through it by capillary action. It has also been proposed to spray these materials into the main or to fog them into the gas stream.

Diethylene glycol and ethylene glycol are effective as materials for leak proofing cellulosic packing principally because they have the power to swell the fibers to the same degree as has water, thereby completely restoring the desiccated packing to the expanded state in which it was before its loss of moisture to dry gas.

Very few other substances have this ability to swell dry jute or other cellulosic fiber to substantially the same extent as does water. This ability is a unique and unpredictable property as many glycol derivatives and other apparently analogous substances do not possess it.

Water has the power to expand the volume of dry jute fiber 44% on saturation. Water, of course, is not available for leak proofing packing because of its high vapor pressure and its consequent rapid absorption by dry gas. It was this loss of water from the packing to the gas which caused the leakage it is desired to correct.

The swelling properties of various liquids are set forth in the following tables.

TABLE 1

Substances causing substantially the same swelling as water (44%)

| | Per cent |
|---|---|
| Ethylene glycol | 44 |
| Diethylene glycol | 44 |
| Mono methyl ether of ethylene glycol | 38 |
| Mono methyl ether of diethylene glycol | 44 |
| Glycerine | 44 |

TABLE 2

Glycol derivatives causing negligible swelling

| | Per cent |
|---|---|
| Mono butyl ether of diethylene glycol | 0 |
| Mono phenyl ether of ethylene glycol | 0 |
| Triethylene glycol | 1 |
| Mono ethyl ether of triethylene glycol | 2 |
| Mono methyl amyl ether of ethylene glycol | 4 |

TABLE 3

Miscellaneous materials causing negligible or incomplete swelling

| | Per cent |
|---|---|
| Mixed tar bases | 0 |
| Hexone | 3 |
| Quinoline | 4 |
| Octyl aldehyde | 8 |
| Decane | 8 |
| Triethyl benzene | 9 |
| Octyl alcohol | 11 |
| Olive oil | 13 |
| Spindle oil | 14 |

All of the substances in Table 1 have low vapor pressures, are relatively inert to the gas and all of them except glycerine have moderate viscosities and are rapidly absorbed by the packing. All of them except glycerine when used by itself are very suitable for leak proofing fiber packing and are very effective when they are brought into proper contact with the packing. Glycerine by itself has too high a viscosity for rapid absorption by the packing even if brought into effective contact with it.

In many distribution systems, however, tar, gums, resins and dust have been deposited from the gas upon the packing and operate to exclude the substances in Table 1 from contact with the packing. These substances are not effective softening agents for the tars, gums and resins and are capable of improvement in dust wetting power though the mono methyl ethers are improvements over the corresponding glycols in this respect.

The result is that in such systems the efficiency of these substances in the prevention of leakage is impaired.

An object of the present invention is to provide an improved leak proofing composition for cellulosic fiber packing in the joints of gas distribution systems which will possess sufficient solvent power in respect to tars, resins and gums to be satisfactory in general use, which will be of appropriate viscosity and vapor pressure to be readily absorbed and retained by the packing and of sufficient swelling power to restore the desiccated fiber substantially to its former volume when it was saturated with water.

Another object of the invention is to provide an improved composition for wetting and laying dust on the walls of mains produced by the drying out of the mains by dry gas.

Generally stated this invention is an improvement in leak proofing and dust laying compositions for gas distribution systems comprising two or more mutually miscible liquids, one of which is adapted to assist in softening tarry and resinous deposits which may cover joints and to increase the wetting and spreading power of the composition upon the walls of the gas mains, and is selected from the phenols such as phenol and cresol; and the other of which is adapted to cause swelling or expansion of the fiber packings to substantially the same extent as saturation with water. That is, the second liquid has the power to cause dry jute fiber to increase in volume in excess of say 35%, and comprises any one or a mixture of any two or more of the aliphatic polyalcohols and ethers enumerated in Table 1, namely, ethylene glycol, diethylene glycol, mono methyl ether of ethylene glycol, mono methyl ether of diethlene glycol, and glycerine.

I have found that the addition of phenol and cresol or mixtures of these in amounts up to say 40% of these aliphatic polyalcohols and ethers, facilitates the wetting and penetrating power of the mixture with respect to the gums, tars and dust which may be present in the main and thereby facilitates the penetration of the polyalcohols and ethers to the packing within the joint. I have further found that phenol and cresol in the admixture do not reduce the powers of the other ingredients to cause swelling of the fibrous packing given in Table 1. Larger quantities of tar and gum solvent and wetting agent may be employed if desired.

Because solutions containing phenol and cresol have a slightly more corrosive action upon iron than the aliphatic polyalcohols and ethers specified it is desirable to add from .5 to 1.5% of triethanolamine or other suitable substance as an inhibitor of corrosion. The addition of 1.5% renders the composition containing phenol or cresol even less corrosive than glycol or glycerine compositions in which no phenol or cresol has been included.

An example of a preferred composition for leak proofing and laying dust in gas distribution systems is the following:

| | Per cent |
|---|---|
| Diethylene glycol | 65 |
| Glycerine | 13.5 |
| Phenol | 15 |
| Cresol | 5 |
| Triethanolamine | 1.5 |

As before stated, glycerine by reason of its high viscosity is not readily absorbed by the packing materials. The whole swelling agent, however, may consist of glycerine particularly if a sufficient quantity of phenol is added so that rapid absorption by the packing occurs. An example of a suitable glycerine-phenol composition is glycerine 60 parts by volume and phenol 40 parts by volume. Since cresol is not miscible with high concentrations of glycerine it is not interchangeable with phenol for use in leak proofing compositions in which the whole swelling agent consists of glycerine. However, where glycerine is mixed with a substantial percentage of the other specified polyalcohols or ethers, cresol may be used interchangeably with phenol as the tar and gum solvent and wetting agent.

It will be seen that in the case of the glycerine-phenol composition the phenol serves a double purpose, namely (1) to reduce the viscosity of the glycerine so that rapid absorption by the jute packing is possible, and (2) to soften the tar and gum deposits and to increase the wetting action of the mixture upon dust deposits within the distribution system. The term phenol includes the technical and commercial grades of phenol. The same applies to the term cresol.

It will be understood that changes, omissions, additions, substitutions and/or modifications might be made within the scope of the claims without departing from the spirit of the invention.

I claim:

1. A method for treating the interior of a gas distribution system which comprises applying to the interior of said system a liquid mixture comprising a phenol and at least one of a group consisting of ethylene glycol, diethylene glycol, monomethyl ether of ethylene glycol, monomethyl ether of diethylene glycol, and glycerine.

2. A method for treating the interior of a gas distribution system which comprises applying to the interior of said system a liquid mixture comprising at least one of a group consisting of ethylene glycol, diethylene glycol, mono-methyl ether of ethylene glycol, mono-methyl ether of diethylene glycol, and glycerine and at least one of a group consisting of phenol and cresol.

3. A method for reducing gas leakage through fibrous packing such as jute in a joint of a gas distribution system, said packing having accumulations such as tar and gum on the surface thereof, comprising impregnating said packing with a cellulosic fiber swelling agent selected from a group consisting of ethylene glycol, diethylene glycol, monomethyl ether of ethylene glycol, monomethyl ether of diethylene glycol, and glycerine by bringing said agent into contact with said packing in the presence of a phenol, said phenol acting as a tar and gum solvet and wetting agent.

4. A method for laying dust in the interior of a gas distribution system, said interior aving dust sources with deposits of tar and gum thereon, comprising enveloping said dust sources with a dust laying liquid selected from a group consisting of ethylene glycol, diethylene glycol, monomethyl ether of ethylene glycol, monomethyl ether of diethylene glycol, and glycerine by bringing said liquid into contact with said dust sources in the presence of a phenol, said phenol acting as a tar and gum solvent and wetting agent.

5. A method for rejuvenating cellulosic packing such as jute in a joint of a gas distribution system to reduce gas leakage at said joint, said packing being at least partially coated with accumulations such as tar and gum, comprising contacting said packing with a liquid mixture comprising at least one of a group consisting of ethylene glycol, diethylene glycol, mono-methyl ether of ethylene glycol, mono-methyl ether of diethylene glycol, and glycerine and at least one of a group consisting of phenol and cresol.

6. A method for laying dust in a gas distribution system, the walls of said system having accumulations such as tar and gum, comprising coating the walls of said system with a liquid mixture comprising at least one of a group consisting of ethylene glycol, diethylene glycol, mono-methyl ether of ethylene glycol, monomethyl ether of diethylene glycol and glycerine and at least one of a group consisting of phenol and cresol.

7. In a method for reducing gas leakage through fibrous packing such as jute in a joint of a gas conduit, the step of impregnating said fibrous packing while in place in said joint with a liquid mixture comprising one of a group consisting of ethylene glycol, diethylene glycol, monomethyl ether of ethylene glycol, mono-methyl ether of diethylene glycol, and glycerine and one of a group consisting of phenol and cresol.

8. A joint in a gas distribution system comprising spaced cooperating elements, cellulosic fibrous packing such as jute between said cooperating elements positioned to form a seal, and a liquid mixture absorbed by said packing, said liquid mixture comprising at least one of a group consisting of ethylene glycol, diethylene glycol, mono-methyl ether of ethylene glycol, monomethyl ether of diethylene glycol and glycerine and at least one of a group consisting of phenol and cresol.

JOHN R. SKEEN.